Patented Apr. 27, 1943

2,317,866

UNITED STATES PATENT OFFICE 2,317,866

ELECTROCHEMICAL HALOHYDRINATION AND ELECTRODE REGENERATION

Miroslav Tamele, Oakland, and Lloyd B. Ryland, El Cerrito, Calif., assignors to Shell Development Company, San Francisco, Calif., a corporation of Delaware No Drawing. Application June 27, 1940, Serial No. 342,696

3 Claims. (Cl. 204—81)

The present invention relates to electrolysis and pertains to the electrochemical treatment of unsaturated aliphatic and/or alicyclic alcohols to produce the corresponding halogenated organic hydroxy compounds. More specifically, the invention pertains to a process whereby high yields of halohydrins may be produced by electrochemical treatment of unsaturated alcohols. The invention also includes a process whereby the electrodes employed in cells used for the electrochemical halohydrination of the unsaturated alcohols may be periodically conditioned so that the electrochemical process may be effected economically and/or continuously.

It has been previously discovered that halogenated organic hydroxy compounds may be produced from unsaturated aliphatic and/or alicyclic alcohols by subjecting mixtures or solutions thereof with aqueous hydrogen halide solutions to the action of a direct electric current. This has been disclosed and claimed in the co-pending patent application Serial No. 341,710 filed June 21, 1940, now Patent No. 2,282,682, May 12, 1942. According to the process described therein aqueous hydrogen halide solutions are introduced into cells containing one or more anode and one or more cathode electrodes, unsaturated alcohols are then introduced thereinto, and the mixture or solution thus obtained is subjected to the action of a direct electric current which causes the conversion of the unsaturated alcohols to the corresponding halohydrins. The concentration of the unsaturated aliphatic and/or alicyclic alcohols in the electrolyte, according to the teachings of the above process, should be preferably maintained quite low, namely between about 0.01% and 0.5% and preferably in the neighborhood of 0.05% by weight of the electrolyte. Also, as described in the aforementioned application, the hydrogen halide concentration is between about 0.1 and 5 normal and preferably between a normality of 1 and 3. The current density of the electric current passed between the electrodes and through the solution should be below about 25 amperes and preferably between about 5 and 10 amperes per square decimeter of anode surface employed. When the electrolysis is effected under the above described conditions, the unsaturated alcohols, such as allyl alcohol, are converted to the corresponding halohydrins which may then be recovered from the electrolyte by any known means.

Another method for the production of halohydrins is disclosed and claimed in the co-pending patent application Serial No. 342,126 filed June 24, 1940, now Patent No. 2,282,683, May 12, 1942. According to this process, a mixture or solution of an aqueous solution of an alkali metal halide, such as sodium chloride, and of an unsaturated aliphatic and/or alicyclic alcohol, e. g. allyl alcohol, is introduced into a cell preferably provided with a diaphragm which divides the same into an anode and a cathode containing compartments. The mixture or solution is then subjected to the action of the direct electric current conveyed through the solution between the electrodes disposed in the respective compartments. As disclosed in this application, the alkali metal halide concentration should preferably be between about 0.1 M and 3 M, while the concentration of the unsaturated alcohol should be maintained below about 0.5% and preferably in the neighborhood of 0.05% by weight of the solution employed. As in the case of the halohydrination of unsaturated alcohols in aqueous hydrogen halide solutions, the electric current conveyed through the solution should have a density of below about 25 and preferably between about 5 and 10 amperes per square decimeter of the anodic electrode surface employed. Also in both types of electrochemical conversion of unsaturated alcohols to the corresponding halogenated organic hydroxy compounds, such as halohydrins, the concentrations of the unsaturated alcohol and of the hydrogen halide or the alkali metal halide should be maintained within the defined limits by continuous or periodic introduction of additional quantities of these reactants as they are used up in the process.

A method of determining the efficiency of an electrochemical process for transforming a given substance into another is by determining its current efficiency. This term denotes the ratio of the number of mols of substance transformed to the amount of electricity employed therefor. For example, the alcohol current efficiency of a given electrochemical halohydrination operation would be the ratio of the number of mols of the unsaturated alcohol used up in the cell divided by the amount of electricity actually employed or consumed. Since in the electrochemical halohydrination of unsaturated alcohols (whether in aqueous hydrogen halide solutions or in aqueous alkali metal halide solutions), two faradays of electricity are used to form one mol of the halohydrin, only one-half of the electricity actually employed must be considered in calculating the current efficiency of the process.

Although the alcohol current efficiencies of the above outlined processes are very high, it has been discovered that the continued use of the cells for the electrochemical halohydrination of unsaturated aliphatic and/or alicyclic alcohols lowers this efficiency, and that after a relatively prolonged electrolysis the process becomes uneconomical due to the fact that the amount of electricity necessary for the conversion of the alcohols becomes excessive. It has been further discovered that this decrease in the current efficiency is due at least in part to the poisoning of the electrodes which, with use, become coated, impregnated and/or altered by viscous water-insoluble materials. Although the exact chemical composition of these impurities which alter the efficiency of the electrode or electrodes is not known, it is believed at the present time that these impurities consist of or comprise highly halogenated and/or oxygenated organic compounds formed as the result of side-reactions during the electrochemical halohydrination of the unsaturated alcohols. These impurities accumulate on and in the anodes and gradually lower the alcohol current efficiency of the process. As a general rule, these viscous impurities may be removed from the electrodes by means of organic solvents in which the impurities are soluble, or by subjecting the electrodes to high temperatures in the presence of air which causes the combustion of the impurities. When thus removed, the efficiency of the electrodes is restored so that the above outlined efficient electrochemical halohydrination may be continued. It is to be noted, however, that such regeneration of the electrodes necessitates the removal of the poisoned electrodes from the cells which naturally lowers the economics of the process.

It is, therefore, the main object of the present invention to provide a process wherein the electrodes which have been poisoned by impurities formed during electrochemical halohydrination of unsaturated alcohols, may be regenerated without the necessity of removing the electrodes from the cells in which these electrodes are disposed. A further object of the invention is to provide a process whereby such poisoned electrodes may be regenerated periodically without the necessity of disassembling the cells, thereby permitting the continuous or substantially continuous electrochemical conversion of unsaturated aliphatic and/or alicyclic alcohols to the corresponding halogenated organic hydroxy compounds.

It has now been discovered that the above and other objects may be attained by reversing the polarity of the cell for a relatively short time. In other words, in accordance with the process of the present invention, the electrodes which have been poisoned by impurities gradually accumulating thereon, may be restored to their previous high efficiency by passing an electric current between these electrodes in a direction opposite to that originally employed. Under such conditions, the electrode or electrodes which were originally the cathodes become the anodes, and vice versa. The degree of regeneration of the electrodes depends on the strength of the current employed and the period of time during which the cell is subjected to the electric current which, as stated, is passed in a direction opposite to that originally employed. Although the exact reason or theory of the electrode regeneration is not known, it is believed that the impurities absorbed by the electrodes are reduced by nascent hydrogen formed at such electrodes while the cell is subjected to the electric current passing in the direction opposite to that originally employed. In this connection, it must be noted that when, for example, aqueous solutions of hydrogen halide and of an unsaturated alcohol are subjected to the action of a direct electric current, halohydrins are formed in the vicinity of the anode or anodes while hydrogen is evolved at the cathode. The aforementioned impurities which poison the electrodes are formed at the anodes. Now, when the direction of the current is reversed, so that the polarity of the electrodes is changed, the nascent hydrogen will evolve at the electrode or electrodes which were originally anodic, i. e. those covered or impregnated with the undesirable impurities. This nascent hydrogen apparently reacts at the source with the impurities and either reduces them or at least converts them into a state in which they are not detrimental to the effective continuation of the electrochemical halohydrination process.

The period of time during which the cell is subjected to reversed polarity, as well as the strength of current employed, may vary within relatively wide limits, and will depend on a number of variables, such as the degree of contamination of the anodic electrodes, degree of electrode regeneration desired, number and size of the anodic and cathodic electrodes, etc. Generally speaking, the degree of electrode regeneration increases with an increase in the strength of current employed and the period of time during which reversed polarity is employed. If the cells employed for the electrochemical halohydrination according to the processes outlined above contain cathodes and anodes of equal effective surfaces, the regeneration of the anodes could be effectively realized by a mere reversal of direction of electrical current, so that an electric current of the same intensity is passed through the solution but in the opposite direction. In fact, in such cases, and particularly where simple diaphragmless cells are employed, the halohydrination of unsaturated alcohols could be effected continuously or substantially continuously by periodic reversal of direction of current flow and maintenance of such conditions until the electrodes attached to the positive pole become poisoned to such an extent that the efficiency begins to approach an economic minimum. When such a state occurs, the polarity of the cell may be again reversed and halohydrination continued until the electrodes which now act as the anodes show signs of being excessively poisoned. Obviously, when operating under such conditions, means should be provided for the continuous or intermittent replenishment of the reactants and for the withdrawal of the reaction products from the cell.

When the cells employed for the electrochemical conversion of unsaturated aliphatic and/or alicyclic alcohols to the corresponding halogenated organic hydroxy compounds, are provided with cathodes and anodes of unequal surfaces, it is advantageous, although not absolutely necessary, to continue the passage of the electric current in a reverse direction (with respect to that originally maintained) only for a period of time sufficient to destroy or reduce the impurities in the anodes, and thus restore the efficiency of the electrodes and of the halohydrination process conducted therein. The original polarity of the cell should then be restored. This is due to the fact that, as noted above, the halohydrination is efficient when the current density is preferably between about 5 and 10 amperes per dm.² of anodic surface. If the effective cathode and anode surfaces are dissimilar, as in the case where a cell has a greater number of anodes than cathodes, when the polarity is reversed (thus making the original cathode or cathodes to act as the anodic termini), it might be necessary to either maintain an excessive current density or to decrease the current strength. The former will increase the tendency of formation of by-products, while the latter decreases the rate of halohydrination, and therefore, the efficiency of the electrochemical process.

The following examples will serve to illustrate the present invention, it being understood that there is no intention of being limited by any details of operation, such as temperature, pressure, character and concentrations of the starting materials and of final products, electric current densities, etc., disclosed herein, the invention being considered to be coextensive in scope with the appended claims.

Example I

A cell provided with six anodes and one cathode made of graphite, these electrodes being immersed in an electrolyte consisting of about 8000 cc. of a one normal aqueous hydrochloric acid solution. Before use, the graphite electrodes were throughly baked at a relatively high temperature to burn off and remove therefrom any organic impurities which may have been present on and/or in the electrodes. An electric current of 125 amperes was passed at a voltage of between about 5 and 6 volts between the electrodes disposed in the aforementioned solution maintained at about 30° C. The current density was about 10.4 amperes per square decimeter of anode surface, and about 30.3 amperes per square decimeter of cathode surface. Allyl alcohol was introduced into the cell at a rate at which it was expected to be consumed and converted to chlorhydrins, this introduction being effected intermittently and in such amounts that the allyl alcohol concentration in the electrolyte was maintained between about 0.01% and 0.18% by weight. Concentrated hydrochloric acid was also added at substantially the same rate so as to maintain approximately a two normal concentration thereof in the electrolyte. Periodically, the electrolysis was stopped, the gases leaving the cell were analyzed, and the liquid phase was removed from the cell and also analyzed. Thereafter, fresh aqueous hydrochloric acid and allyl alcohol were introduced into the same cell, and the electrolysis re-initiated. The following table shows the alcohol current efficiencies and analyses of the exit gases thus obtained:

| Total faradays passed | Alcohol current efficiency | Exit gas composition | | | | | | |
|---|---|---|---|---|---|---|---|---|
| | | $CO_2$ | CO | $O_2$ | Olefins | Paraffins | $H_2$ | $N_2$ |
| | Per cent | Per cent | Per cent | Per cent | Per cent | Per cent | Per cent | Per cent |
| 32.7 | 97.3 | 0.0 | 0.1 | 0.4 | 0.2 | 0.3 | 98.1 | 0.9 |
| 70.0 | 97.2 | 0.2 | 0.0 | 0.5 | 0.1 | 0.3 | 98.4 | 0.5 |
| 107.3 | 95.7 | 0.4 | 0.0 | 0.6 | 0.0 | 0.3 | 98.0 | 0.7 |
| 144.6 | 89.7 | 1.2 | 0.8 | 1.5 | 0.6 | 0.3 | 93.7 | 1.9 |

From the above table, it is seen that the alcohol current efficiency gradually decreased from about 97.3% to about 89.7%. Simultaneously, the oxygen, carbon monoxide and carbon dioxide contents of the evolved gases rose from a total of about 0.5% to about 3.5% indicating the existence of side-reactions, such as oxidation.

At the end of the above four tests, the polarity of the electrodes was reversed for a short period of time. Since the cell had six anodes arranged around a single cathode, only one-third of the current was used. A total of less than two faradays of electricity was thus passed through the solution. Thereafter, fresh aqueous hydrochloric acid and allyl alcohol were again introduced into the cell and electrolysis was again resumed with the same polarity as that employed originally. This was continued until another 33.8 faradays of electricity was passed. It was found that the alcohol efficiency at the end of this run was 95.7%, thus clearly indicating that the electrodes originally poisoned by the impurities, were regenerated by the aforementioned reversal of their polarity. The decrease in side-reactions was also clearly seen from an analysis of the exit gases which had the following composition:

| | Per cent |
|---|---|
| Carbon dioxide | 0.9 |
| Carbon monoxide | 0.2 |
| Oxygen | 0.1 |
| Olefins | 0.5 |
| Paraffins | 1.1 |
| Hydrogen | 96.3 |
| Nitrogen | 0.9 |

Even after the passage of another 37.3 faradays of electricity, the alcohol current efficiency was still about 91.2%.

Example II

The cell employed for the electrochemical chlorhydrination described in Example I was employed. The electrodes, although found to be poisoned by impurities formed during a previous test, were not regenerated. The electrolyte consisted of a one normal aqueous hydrochloric acid solution. In other respects, the operating conditions were the same as those described in Example I. After the passage of 14.0 faradays of electricity, the alcohol current efficiency was found to be about 86.7%, while the evolved gases contained about 0.9% carbon dioxide, 0.3% carbon monoxide and 1.7% oxygen. The polarity of the electrodes was then reversed and, due to the fact that there were six anodes and only one cathode, one-third of the current normally employed was used. This electrolysis was conducted until about 1.8 faradays of electricity was passed through the solution. The evolved gases during this period of operation contained about 10.4% oxygen, together with about 1% of carbon monoxide and dioxide.

After the passage of the above quantity of electricity, electrolysis was reinstituted with the electrodes having the original polarity. This time, 10.45 faradays of electricity were conveyed through the solution, the hydrochloric acid and allyl alcohol concentrations of which were maintained by periodic introductions of additional quantities thereof. An analysis of the electrolyte at the end of this run showed that it predominated in glycerol mono- and dichlorhydrins. The alcohol current efficiency was very high (97%), and the evolved gases contained only about 0.1% oygen, no carbon monoxide and only 0.5% carbon dioxide.

Although the above invention has been described with particular reference to the electrochemical chlorhydrination of allyl alcohol and to the regeneration of the electrodes of the cells employed therefor, it is to be understood that the present process is equally applicable in the case of the electrochemical halohydrination of other unsaturated aliphatic and/or alicyclic alcohols, as described in the aforementioned co-pending applications. In fact, the present invention may be applied to the regeneration of electrodes employed for the electrochemical conversion of all types of these unsaturated alcohols to the corresponding halohydrins, such as chlorhydrins or bromhydrins, whether the electrolyte contains aqueous solutions of the corresponding hydrogen halides or of the alkali metal halides. Also, although the halohydrination in the above-described examples was effected at temperatures within the range of between about 20° C. and 30° C., and at atmospheric pressures, it is possible to operate at higher and lower temperatures and pressures without any substantial effect either on the halohydrination reaction or on the regeneration of the electrodes employed in the cells.

We claim as our invention:

1. In a process for the production of a glycerol halohydrin by subjecting a mixture of allyl alcohol and a substance of the group consisting of an aqueous hydrogen halide solution and an aqueous alkali metal halide solution to the action of a direct electric current transmitted through the mixture between anodic and cathodic electrodes disposed therein while maintaining the concentration of allyl alcohol in the mixture in the range of from about 0.01% to 0.5% by weight, whereby the allyl alcohol is halohydrinated and the anodic electrode becomes poisoned by products of side-reactions, the method of regenerating the poisoned anodic electrode and thereby maintaining the efficiency of the process which comprises periodically reversing the polarity of the electrodes.

2. In a process for the production of a glycerol chlorhydrin by subjecting a mixture of allyl alcohol and an aqueous solution of hydrogen chloride to the action of a direct electric current transmitted through the mixture between anodic and cathodic electrodes disposed therein while maintaining the concentration of allyl alcohol in the mixture in the range of from about 0.01% to 0.5% by weight and while maintaining the concentration of hydrogen chloride in the mixture between about 1 and 3 normal, whereby the allyl alcohol is chlorhydrinated and the anodic electrode becomes poisoned by products of side-reactions, the method of regenerating the poisoned anodic electrode and thereby maintaining the efficiency of the process which comprises periodically reversing the polarity of the electrodes.

3. In a process for the production of halohydrins by subjecting a mixture of an unsaturated alcohol and a substance of the group consisting of an aqueous hydrogen halide solution and an aqueous alkali metal halide solution to the action of a direct electric current transmitted through the mixture between anodic and cathodic electrodes disposed therein while maintaining the concentration of the unsaturated alcohol in the mixture in the range of from about 0.01% to 0.5% by weight, whereby the unsaturated alcohol is halohydrinated and the anodic electrode becomes poisoned by products of side-reactions, the method of regenerating the poisoned anodic electrode and thereby maintaining the efficiency of the process which comprises periodically reversing the polarity of the electrodes.

MIROSLAV TAMELE.
LLOYD B. RYLAND.